United States Patent
Kumar

(10) Patent No.: US 10,120,766 B2
(45) Date of Patent: Nov. 6, 2018

(54) MODEL-BASED SYSTEM AND METHOD FOR UNDOING ACTIONS IN AN APPLICATION

(71) Applicant: Business Objects Software, Ltd., Dublin (IE)

(72) Inventor: Viren Kumar, Vancouver (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 440 days.

(21) Appl. No.: 14/885,682

(22) Filed: Oct. 16, 2015

(65) Prior Publication Data
US 2017/0109243 A1  Apr. 20, 2017

(51) Int. Cl.
| | | |
|---|---|---|
| *G06F 17/30* | (2006.01) | |
| *G06F 11/14* | (2006.01) | |
| *G06F 9/455* | (2018.01) | |
| *G06F 8/35* | (2018.01) | |

(52) U.S. Cl.
CPC .......... *G06F 11/1466* (2013.01); *G06F 8/355* (2013.01); *G06F 9/45529* (2013.01); *G06F 11/1471* (2013.01); *G06F 2201/84* (2013.01)

(58) Field of Classification Search
CPC .. G06F 11/1466; G06F 9/45529; G06F 8/355; G06F 11/1471; G06F 2201/84; G06F 17/30088; G06F 17/30575
See application file for complete search history.

(56) References Cited

U.S. PATENT DOCUMENTS

| | | | | |
|---|---|---|---|---|
| 5,956,728 A  * | 9/1999 | Federighi | .................. | G06F 8/24 |
| 7,478,336 B2 * | 1/2009 | Chen | ..................... | G06F 3/0481 |
| | | | | 715/724 |
| 7,546,602 B2 * | 6/2009 | Hejlsberg | .................. | G06F 9/54 |
| | | | | 717/114 |
| 7,904,466 B1 * | 3/2011 | Valencia | ........... | G06F 17/30144 |
| | | | | 707/758 |
| 9,317,375 B1 * | 4/2016 | Sadhu | ................. | G06F 11/1451 |

(Continued)

OTHER PUBLICATIONS

K. Jakubec, M. Poak, M. Necasky, I. Holubova, "Undo/Redo Operations in Complex Environments," Procedia Computer Science 32, 5th International Conference on Ambient Systems, Networks and Technologies (ANT-2014), 2014, pp. 561-570. www.sciencedirect.com.

*Primary Examiner* — Noosha Arjomandi
(74) *Attorney, Agent, or Firm* — Fountainhead Law Group P.C.

(57) ABSTRACT

An improved model-based approach for undoing actions in an application that was not previously configured with an undo feature is disclosed. Object models are constructed for each object invoked by the application. Snapshots of the object model are captured after every action to preserve the object model state at different points in time. The object model includes an object tree data structure having multiple nodes comprising data and metadata for the object. The object model is frozen and editing of the object is only permitted via an undo management engine. In response to edits from the application, the undo management engine responds by unfreezing the path of object nodes from leaf node to root node in the object tree data structure. Edits are applied to the object model at the leaf node. The object model can then be re-frozen to maintain the state of the object after each action.

22 Claims, 16 Drawing Sheets

(56) References Cited

U.S. PATENT DOCUMENTS

| | | | |
|---|---|---|---|
| 9,535,907 B1* | 1/2017 | Stringham | G06F 11/1435 |
| 9,767,177 B1* | 9/2017 | Richardson | G06F 17/30575 |
| 2005/0081105 A1 | 4/2005 | Wedel et al. | |
| 2007/0220320 A1* | 9/2007 | Sen | G06F 11/1456 |
| | | | 714/13 |
| 2008/0282057 A1* | 11/2008 | Layden | G06F 12/0223 |
| | | | 711/210 |
| 2009/0157711 A1* | 6/2009 | Baer | G06F 17/3089 |
| 2011/0154063 A1* | 6/2011 | Tani | G06F 21/602 |
| | | | 713/193 |
| 2012/0221998 A1* | 8/2012 | Rowley | G06F 9/451 |
| | | | 717/105 |
| 2013/0282662 A1* | 10/2013 | Kumarasamy | G06F 17/30289 |
| | | | 707/649 |
| 2015/0227602 A1* | 8/2015 | Ramu | G06F 17/30575 |
| | | | 707/634 |
| 2015/0378623 A1* | 12/2015 | White | G06F 3/0619 |
| | | | 711/162 |
| 2016/0306709 A1* | 10/2016 | Shaull | G06F 11/1458 |
| 2016/0320978 A1* | 11/2016 | Barve | G06F 3/065 |
| 2017/0090734 A1* | 3/2017 | Fitzpatrick | G06F 3/04845 |

* cited by examiner

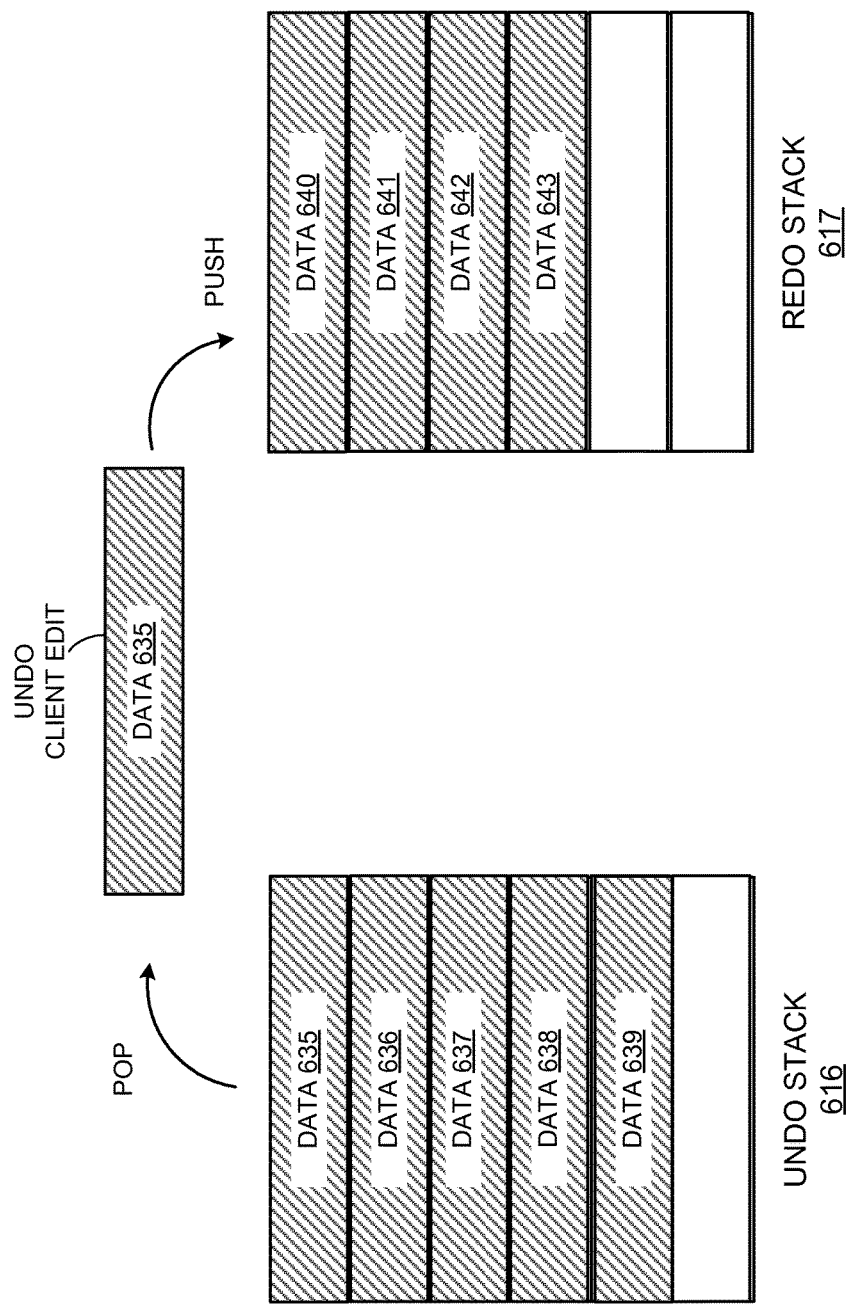

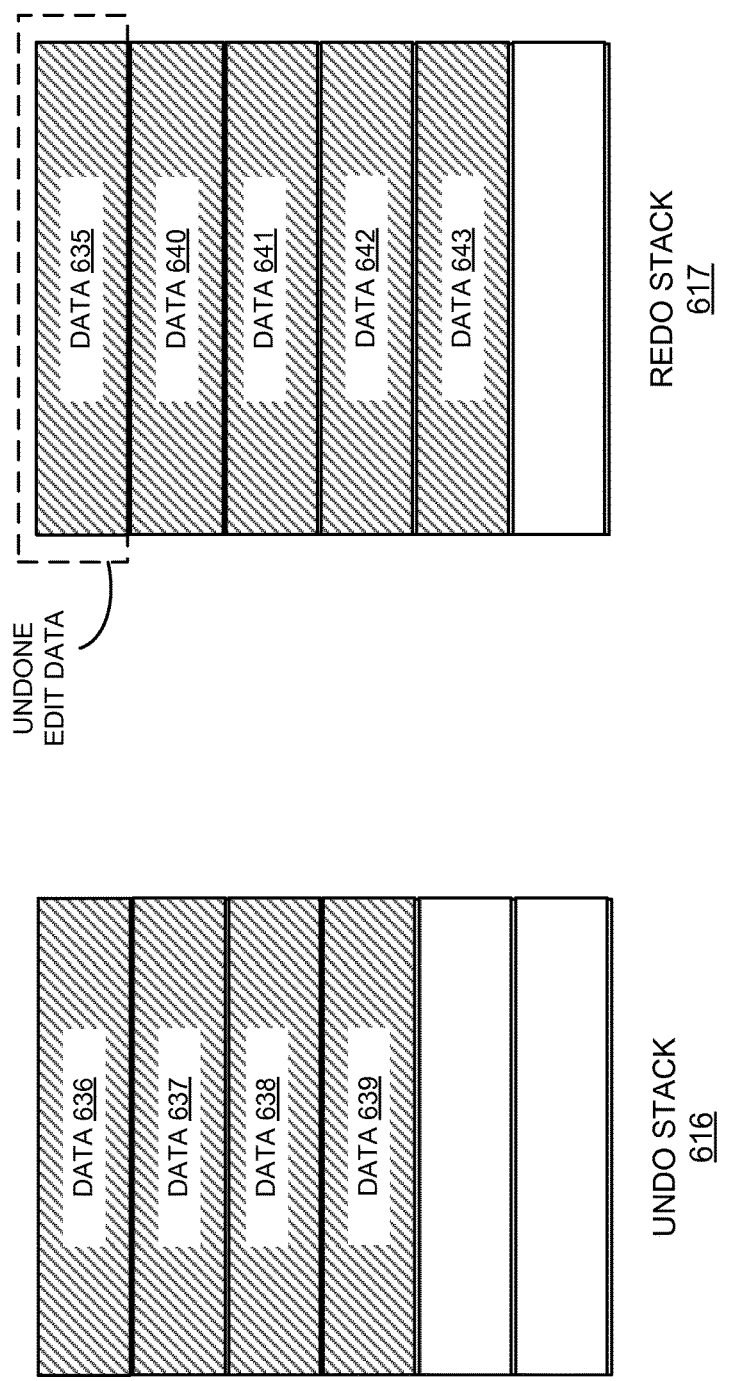

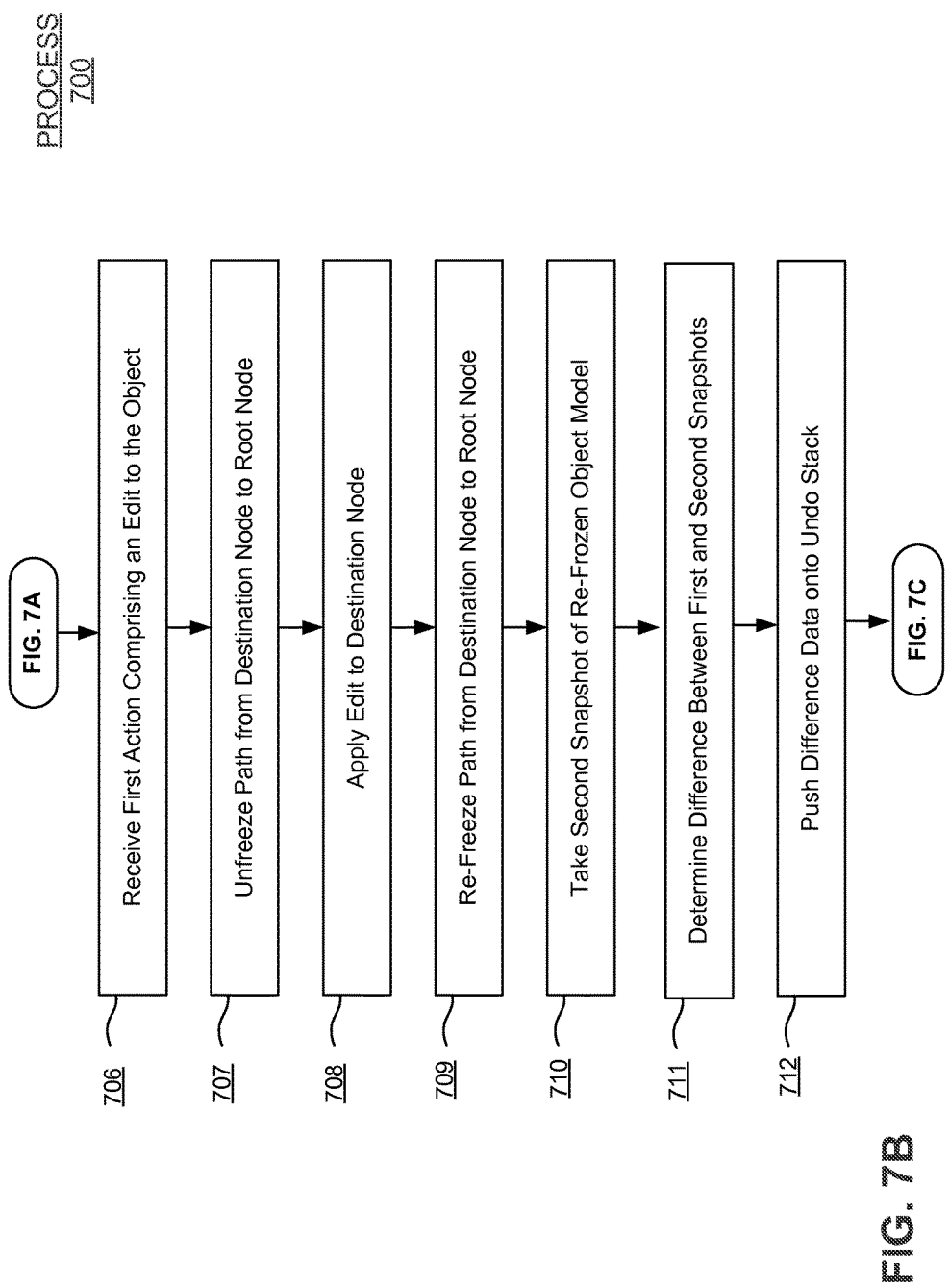

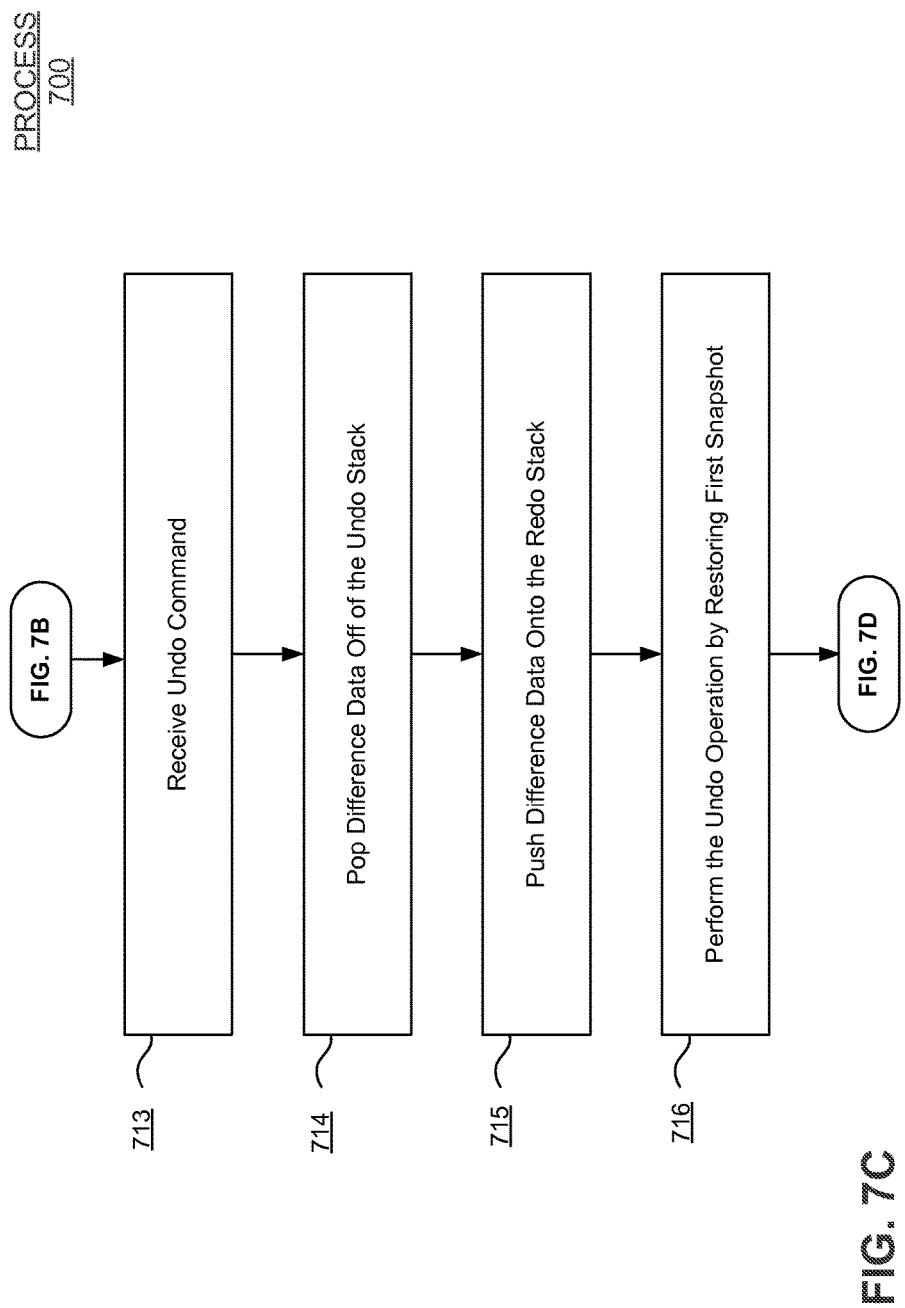

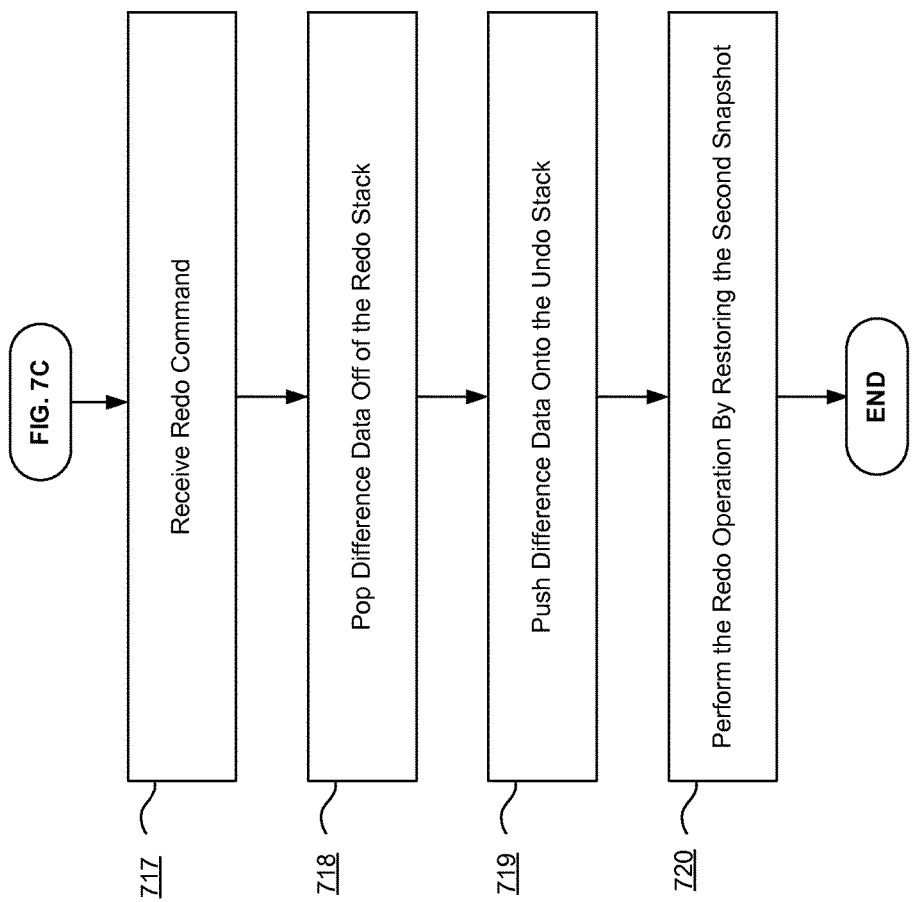

MODEL-BASED SYSTEM AND METHOD FOR UNDOING ACTIONS IN AN APPLICATION

FIELD OF THE INVENTION

At least certain embodiments disclosed herein relate generally to data processing in a computer system, and more particularly to undoing actions in an application.

BACKGROUND

Undo/redo functionality is a common feature of various interactive applications and systems. Most applications provide a mechanism for the user to undo an action, and then redo it if they change their mind about undoing the action. This is a fairly ubiquitous feature and one that users have come to expect when working on their documents or data in most user applications.

Most applications today use a very simple undo/redo model. All actions are stored in a history buffer (e.g., stack buffer). The most recent action may be undone by performing an inverse operation. Such an action is marked as undone and the user may redo it, or may further undo the previous action. This simple model, commonly known as linear undo model, is sufficient in many applications. The result of undo/redo operations may be easily predicted and also the physical implementation is not very complex.

Two architectural approaches exist for implementing undo/redo functions in an application. They include an action-based approach and a model-based approach. In the action-based approach, each action specifies a reverse action that can be applied to undo the action, e.g., if a user types in a word in a word processor, the reverse of that action is to delete the word. When the action is undone, the word is deleted, and when the action is redone, the word reappears again. This approach usually requires that the reverse action be implemented along with the original action.

In the model-based approach, on the other hand, each action modifies a central model that is a representation of the object (e.g., document) being worked on. A snapshot of the model is taken after every action and can be stored in memory. When performing an undo operation, the most recent snapshot of the central model is retrieved from memory. This approach requires that the application have some mechanism to store the model and to set its internal state based on the contents of the model.

Problems arise with the action-based approach when attempting to integrate an undo/redo feature into an already mature product with hundreds or thousands of existing actions. Using the action-based approach with a mature product is much more difficult as it requires adding a reverse action for each and every action. In addition, the biggest challenge with using the model-based approach is memory consumption. A representation of the entire document or object must be stored in memory for each and every action. This can rapidly become onerous and is generally not scalable for large documents.

One strategy to minimize memory consumption is to store only the changes, or differences (or deltas) between successive states of the object mode such that the entire model is not replicated, but only the sections of the model that were changed in between states. However, this strategy is not free and adds the computational expense of calculating the deltas in a fast and efficient manner. The nature of the computer language being used bears on the problem as well, since different languages expose different mechanisms for dealing with objects and equality. A model-based undo architecture in a language that has runtime dynamic polymorphism ("RDP") is both memory-intensive and computationally expensive.

Javascript (which is the language usually used for web applications on the Internet) exhibits RDP, unlike statically compiled languages like C or C++. RDP indicates that the members and properties of a Javascript object can be changed at runtime, unlike in C or C++ or Java, where a class's members and methods are known at compile time and cannot be changed at runtime. For example, the class "C" below coded in Javascript can be modified to have a new member "C.gamma" during program execution, while the class "J" coded in Java below cannot be modified to have a new member at runtime, since Java simply does not support changing class templates at runtime. Adding the member gamma to the Java class J would require modifying the class definition, and then recompiling the class and running it again.

| Javascript | Java |
|---|---|
| C : {<br>alpha : 1,<br>beta : true<br>}<br>C.gamma = "abc"; | Class J {<br>int alpha = 1;<br>boolean beta = true;<br>}<br>J j = new J( )<br>j.gamma = "abc"; //This is impossible and will not compile |

Thus if two objects in Javascript point to the same location in memory, they are considered equal. But if they don't point to the same memory location, then a deeper equality check of the Javascript objects is required, since it is quite possible for an object to have been modified at runtime to contain a new property at some level. This requires a deep, recursive equality check of two Javascript objects to guarantee the two Javascript objects are equal. This is computationally expensive.

SUMMARY

The embodiments described herein include an improved model-based system and method for undoing actions in an application. In one embodiment, a method for undoing actions in an application comprises loading an application into memory, launching an undo management process configured to operate with the application, building an object model for objects invoked by the application, where the object model comprises an object tree data structure having nodes containing metadata of an object, taking a first snapshot of the object model, freezing the object model, receiving a first action from the application comprising an edit to be applied to the object at a leaf node of the object tree data structure, unfreezing a first portion of the object tree data structure along a path of object nodes from the leaf node being modified by the edit up to its root node, applying the edit to the object at the leaf node of the object tree data structure, and then re-freezing the first portion of the object tree data structure to obtain a re-frozen object model.

The method further comprises taking a second snapshot of the re-frozen object model, determining a difference between the first snapshot and the second snapshot by comparing only nodes in the object tree data structure along the path from the leaf node to the root node, and storing the difference between the first snapshot and the second snapshot into a first memory buffer as difference data representing the first action. The plurality of object nodes in the object tree data structure that are not in the path from the leaf node to the root node are left untouched.

The method further comprises receiving an undo command configured to undo the first action comprising the edit to the object, retrieving the difference data representing the first action from the first memory buffer, storing the difference data into a second memory buffer, and undoing the first action comprising the edit to the object by restoring the object model back to its state when the first snapshot was taken.

The method further comprises receiving a redo command configured to redo the first action comprising the edit to the object, retrieving the difference data representing the first action from the second memory buffer, storing the difference data representing the first action back into the first memory buffer, and redoing the first action comprising the edit to the object by restoring the object model back to its state when the second snapshot was taken. In one embodiment, the first memory buffer is an undo stack buffer and the second memory buffer is a redo stack buffer.

In at least certain embodiments, the undo management process is invoked at the time when the application is first loaded to manage access to application objects, and access for editing can only be made through the undo management process. Snapshots of the object model are taken after each action of the application to preserve the state of the object model at different points in time. Undo/redo operations can therefore be performed without requiring implementation of a converse action for every action received from the application.

In another embodiment, a system for undoing actions in an application is disclosed. The system comprises a processor and a system memory in communication with the processor via a communication link. The system memory configured to store computer code, which when executed by the processor, causes the processor to perform operations comprising loading the application into memory, launching an undo management process configured to operate with the application, building an object model for objects invoked by the application, where the object model comprises an object tree data structure having nodes containing metadata of an object, taking a first snapshot of the object model, freezing the object model, receiving a first action from the application comprising an edit to be applied to the object at a leaf node of the object tree data structure, unfreezing a first portion of the object tree data structure along a path of object nodes from the leaf node being modified by the edit up to its root node, applying the edit to the object at the leaf node of the object tree data structure, and then re-freezing the first portion of the object tree data structure to obtain a re-frozen object model.

The operations further comprise taking a second snapshot of the re-frozen object model, determining a difference between the first snapshot and the second snapshot by comparing only nodes in the object tree data structure along the path from the leaf node to the root node, and storing the difference between the first snapshot and the second snapshot into a first memory buffer as difference data representing the first action. The object nodes in the object tree data structure that are not in the path from the leaf node to the root node are left untouched.

The operations further comprise receiving an undo command configured to undo the first action comprising the edit to the object, retrieving the difference data representing the first action from the first memory buffer, storing the difference data into a second memory buffer, and undoing the first action comprising the edit to the object by restoring the object model back to its state when the first snapshot was taken.

The operations further comprise receiving a redo command configured to redo the first action comprising the edit to the object, retrieving the difference data representing the first action from the second memory buffer, storing the difference data representing the first action back into the first memory buffer, and redoing the first action comprising the edit to the object by restoring the object model back to its state when the second snapshot was taken.

In at least certain embodiments, the undo management process is invoked at the time when the application is first loaded to manage access to application objects, and access for editing can only be made through the undo management process.

In yet other embodiments, a non-transitory computer readable storage medium tangibly embodying computer code is described, which when executed by a computer system, causes the computer system to perform operations for undoing actions in an application. The operations comprise launching an undo management process configured to operate with the application, building an object model for objects invoked by the application, where the object model comprises an object tree data structure having nodes containing metadata of an object, taking a first snapshot of the object model, freezing the object model, receiving a first action from the application comprising an edit to be applied to the object at a leaf node of the object tree data structure, unfreezing a first portion of the object tree data structure along a path of object nodes from the leaf node being modified by the edit up to its root node, applying the edit to the object at the leaf node of the object tree data structure, and re-freezing the first portion of the object tree data structure to obtain a re-frozen object model.

In at least certain embodiments, the undo management process is invoked at the time when the application is first loaded to manage access to application objects, and access for editing can only be made through the undo management process.

The following detailed description and accompanying drawings provide a better understanding of the nature and advantages of the present invention.

BRIEF DESCRIPTION OF THE DRAWINGS

For a better understanding of at least certain embodiments, reference will be made to the following detailed description, which is to be read in conjunction with the accompanying drawings.

FIGS. 6C-6D depict example block diagrams showing a pop operation for retrieving edit data off of the undo stack buffer, and a push operation for pushing the edit data onto a redo stack buffer during an undo operation.

FIGS. 7A-7D depict a flow chart of an example embodiment of a method for undoing actions in an application according to the techniques described herein.

DETAILED DESCRIPTION

Figure 1:
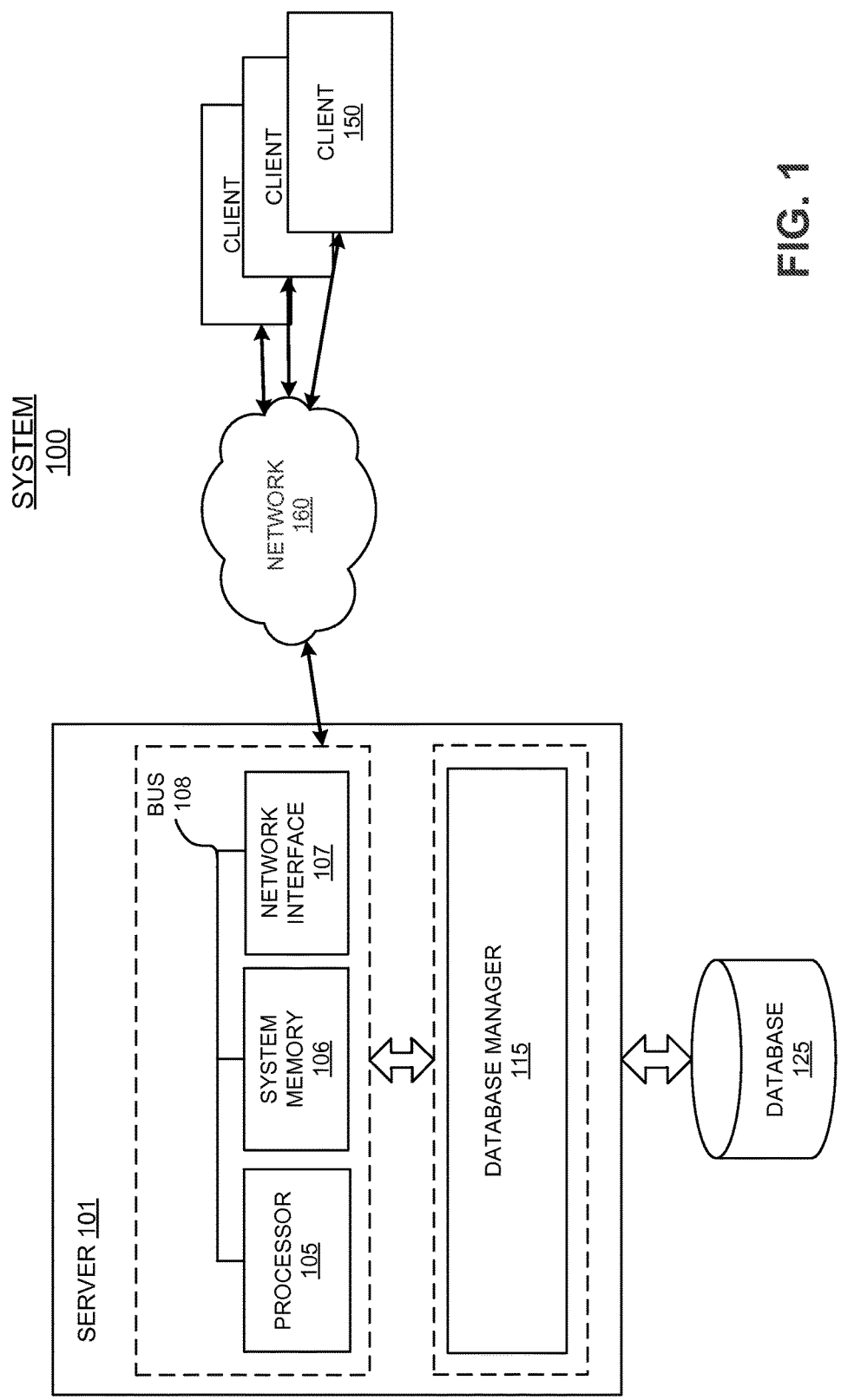
FIG. 1 depicts an example block diagram of a system comprising a client-server relationship upon which the embodiments described herein may be implemented.

Throughout the description, for the purposes of explanation, numerous specific details are set forth in order to provide a thorough understanding of the present invention. It will be apparent to one skilled in the art, however, that the techniques described herein may be practiced without some of these specific details. In other instances, well-known structures and devices may be shown in block diagram form to avoid obscuring the underlying principles of the invention.

The embodiments described herein relate to an improved system and method for implementing an undo feature in an application using a model-based approach. The embodiments are configured to build an object model for each object invoked by the application and to take snapshots of the object model after every action to preserve the state of the object model at different points in time. The object model includes an object tree data structure having a plurality of nodes comprising data and metadata for the object. The embodiments are configured to freeze the object model and to respond to edits from applications by unfreezing the object model along the path from the leaf node (or destination node) of the object model being modified up to the root node in the object tree data structure. Embodiments can then apply the edit to the object model at the leaf node and then re-freeze the object model. The plurality of object nodes in the object tree data structure that are not in the path from the leaf node to the root node are left untouched. In at least certain embodiments, the undo management process is invoked at the time when the application is first loaded to manage access to application objects, and access for editing can only be made through the undo management process.

I. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, or by any combination of hardware and programmed computer components. The techniques described herein are not limited to any specific combination of hardware circuitry or software. Embodiments can also be practiced in distributed computing environments where tasks are performed by remote data processing devices or systems that are linked through one or more wire-based or wireless networks.

FIG. 1 depicts an example block diagram of a system comprising a client-server relationship upon which the embodiments described herein may be implemented. In the illustrated embodiment, system 100 includes a server 101 in communication with one or more clients 150 via one or more networks 160. The server 101 may be implemented as an individual computer hardware server, or as an array of computer hardware servers logically connected together and working in coordination with each other to perform the functionality described herein. Generally, a data server includes a system that performs data operations with respect to data stored in one or more repositories of data. Depending on the type of data server, data operations may range from simple operations, such as storing and retrieving the data, to more complex operations such as computing algorithms or calculating statistics based on the data, or arranging, modifying, or formatting the data.

In addition, server 101 is in communication with one or more databases 125. Server 101 further includes a database manager 115 configured to manage data access operations to and from the database(s) 125. Server 101 may be in remote communication with the database 125 via one or more networks (not shown). Alternatively, the database 125 may be a component of the server 101 and configured to communicate with the server 101 via an interconnect line or network. Database(s) 125 may be implemented as any type of database system. One example embodiment includes a relational database system, in which data is stored in structured tables comprised of rows and columns, and accessed is provided through data storage rules or schemas. Other examples of database systems include event-based systems where data can be stored in a semi-structured or unstructured format.

In the illustrated embodiment, the clients 150 include one or more applications processes that are configured to communicate with the server 101 via network 160. Client applications 150 can be configured to perform data accesses operations on data stored in database 125 by communicating data access requests/commands to the server 101 via network(s) 160. Server 101 can be configured to receive data access requests from client applications 150 and to provide data access responses over the network(s) 160. As shown, server 101 includes a processor 105, a system memory 106, and a network interface 107, each coupled together via an interconnect bus 108.

As will be appreciated by persons of skill in the art, network(s) 160 can be implemented as a single wired or wireless network, or multiple separate networks in communication with one another. Network(s) 160 can be implemented as any wired or wireless network(s). For example, the networks described herein can be implemented as a local area network ("LAN"), wide-area network ("WAN"), combination of LANs and WANs, the Internet, or any other type of communication network adapted for exchanging electronic messages and information.

Further, network(s) 160 can be implemented as a physical array of hardware resources or as a virtual array, or any combination thereof. They can also be implemented in a cloud-based network configuration. For example, the network(s) 160 can be implemented as public or private cloud network or combination thereof. No specific network or network architecture should be construed as limiting the embodiments described herein.

Figure 2:
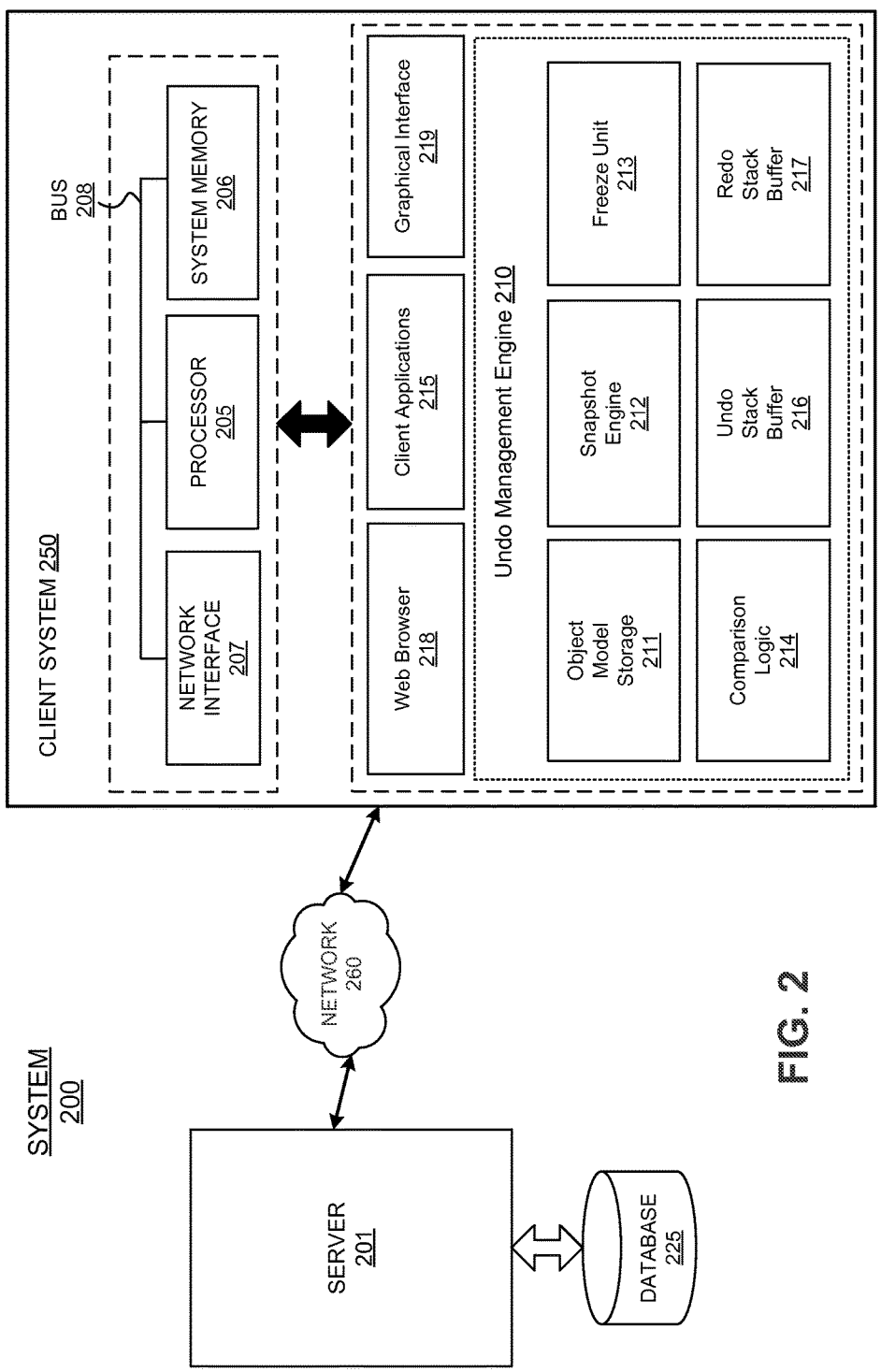
FIG. 2 depicts an example block diagram of an embodiment of a system for undoing actions in an application.

FIG. 2 depicts an example block diagram of an embodiment of a system for undoing actions in an application. In the illustrated embodiment, system 200 includes a server computer system 201 in communication with at least one client computer system 250. The server 201 is also in communication with one or more databases 225. The client computer system 250 comprises a processor 205 and a system memory 206 in communication with the processor via an interconnect bus 208. The system memory 206 is configured to store client applications 215 and other computer modules and processes. Client-accessible applications can also be stored in the database(s) 225. Client 250 is configured to retrieve data, control, and state information for these client applications using database queries via server 201.

Client computer system further includes a web browser 218, a graphical interface 219, and an undo management engine 210. The undo management engine 210 includes a snapshot engine 212, a freeze unit 213, comparison logic 214, an undo stack buffer 216, a redo stack buffer 217, and one or more object models residing in the object model storage 211. Embodiments of the undo management engine 210 can be implemented in hardware, software, or combination thereof. The undo management engine 210 may be stored as executable software components in system memory 206, or may be implemented in hardwired circuitry, either as a part of processor 205 or as a separate component accessible by processor 205; or any combination of hardwired components and software components stored in system memory 206.

The undo management engine 210 is configured to operate with client applications 215 to provide the undo/redo functionality of the embodiments described herein. The undo management engine 210 implements the model-based undo functionality of the present disclosure. In at least certain embodiments, the undo management engine 215 is invoked at the time whenever a client application 215 is first loaded in the client system 250 in order to manage access to objects used by the application 215 and to only permit access for editing of the objects by the application through the undo management engine 210.

The undo management engine 210 is configured to build an object model for each of the objects invoked by the applications running on the client system 250. The object model comprises an object tree data structure having a plurality of object nodes containing metadata of the objects (see, e.g., FIG. 3 below). The object tree data structure stores information—including data and metadata—about the object. The state of objects can be stored in higher-level nodes in the object tree data structure, with sub-nodes underneath containing other information about the object nodes. The object tree data structure may include a root node and a plurality of leaf nodes (or destination nodes) for the edits by the application to be applied to. The object tree data structure may also contain a plurality of intermediate parent nodes and grandparent nodes, etc., of the leaf node along the path from the leaf node up to the root node of the tree.

The object models that are built by the undo management engine 210 can then be stored in object model storage 211. The snapshot engine 212 is configured to take snapshots of the object models stored in storage 211 after each action to preserve the state of the object model at different points in time. The snapshot engine 212 is configured to take a first snapshot of the pristine object model after the object has been loaded in the application and before any edits have been applied.

The freeze unit 213 is configured to freeze the object model, including the plurality of object nodes in the object tree data structure, after each snapshot is taken. Access for editing by the application can then be restricted. In one embodiment, the object model is frozen to only permit edits to be applied to the object through the through the undo management engine 210. A frozen (or immutable) object cannot be modified, which makes it useful for comparisons since no modifications to a frozen object are possible. The immutable aspect of the objects in the object tree data structure can be leveraged to make it easier to determine the differences (or deltas) between snapshots at different points in time.

The client system 250 is then configured to receive a first action from the application 215 comprising an edit to be applied to the object at one of the leaf nodes of the object tree data structure. The first action can be received via the graphical interface 219, or from the network 260 via the network interface 207. The first action specifies the type of action to be taken as well as the particular data or metadata of the object model that is to be modified by the first action.

The freeze unit 213 is configured to unfreeze the object model corresponding to the pristine state of the object captured in the first snapshot. Specifically, the freeze unit 213 is configured to unfreeze a first portion of the object tree data structure along a path of object nodes from the leaf node (or destination node) being modified by the edit up to its root node. In certain cases, the path from the leaf node to the root node may comprise one or more intermediate parent nodes. The path of antecedents is unfrozen and made modifiable in order to apply the change to the destination node.

Figure 3A:
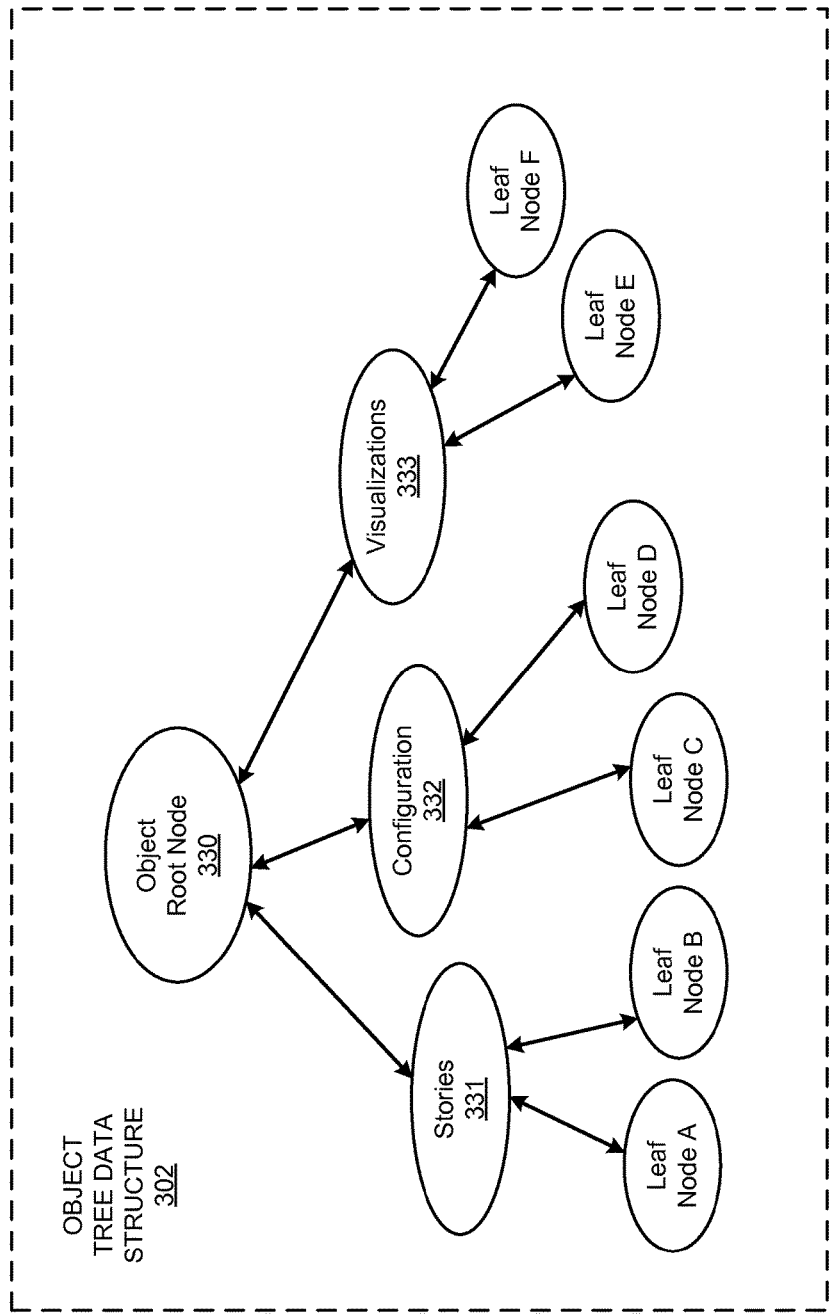
FIG. 3A depicts an example conceptual diagram of an embodiment of an object tree data structure configured to store object data and metadata according to the techniques described herein.
Figure 3B:
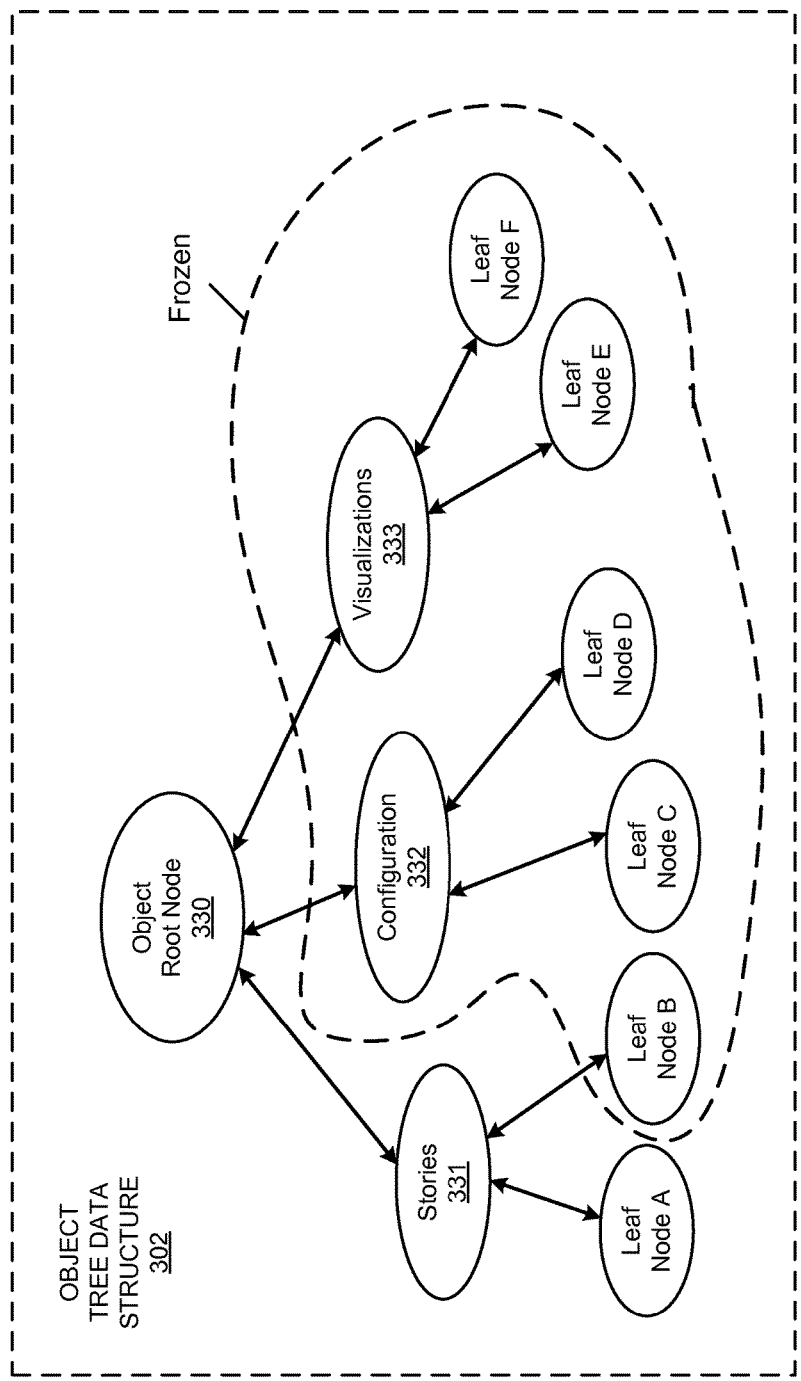
FIG. 3B depicts a diagram of an example embodiment of an object tree data structure depicting frozen object nodes according to the techniques described herein.

FIG. 3A depicts an example conceptual diagram of an embodiment of an object tree data structure configured to store object data and metadata according to the techniques described herein. In the illustrated embodiment, the object tree data structure 302 includes an object model representation of the object including an object root node 330 and a plurality of leaf nodes A-F. As shown, the object tree data structure 302 further includes intermediate parent nodes 331-333. Specifically, the object tree data structure 302 includes a stories parent node 331 having leaf nodes A and B underneath containing the data and metadata corresponding to the stories object node. Likewise, configuration parent node 332 includes leaf nodes C and D, and the visualizations parent node 333 includes leaf nodes E and F.

If an attempted modification of a leaf node of the object tree data structure 302 is received, the freeze unit 213 is adapted to unfreeze all the nodes along the path from the leaf node to the root node in order to apply the change to the object at the destination node. As an example reference is made to FIG. 3B, which depicts a diagram of an example embodiment of an object tree data structure 302 having frozen object nodes according to the techniques described herein. When it is desired to change a property associated with leaf node A, the freeze unit 213 is adapted to unfreeze the object root node 30 and stories node 331, which form the path down to leaf node A.

The undo management engine 210 is then configured to apply the edit to the object at the leaf node of the object tree data structure. After the destination node A has been modified, the freeze unit 213 is configured to re-freeze all the object nodes in the path of the first portion of the object tree data structure to obtain a re-frozen object model that includes the modification to leaf node A. The snapshot engine 212 can then take a second snapshot of the re-frozen object model after the destination node A has been modified.

The second snapshot of the object model can then be used later to return to this state after a subsequent change to the object model in the future. Since only a small subset of the object tree data structure 302 was unfrozen to effect the edit to the destination node A, the object model contained in the second snapshot consists of the same object nodes as the previous first snapshot, with only the unfrozen and refrozen object nodes 330, 331, and leaf node A as new object nodes. In this way, the system can omit copying objects that are not along the path from the root node to the destination node to minimize memory usage and computational complexity.

Figure 4:
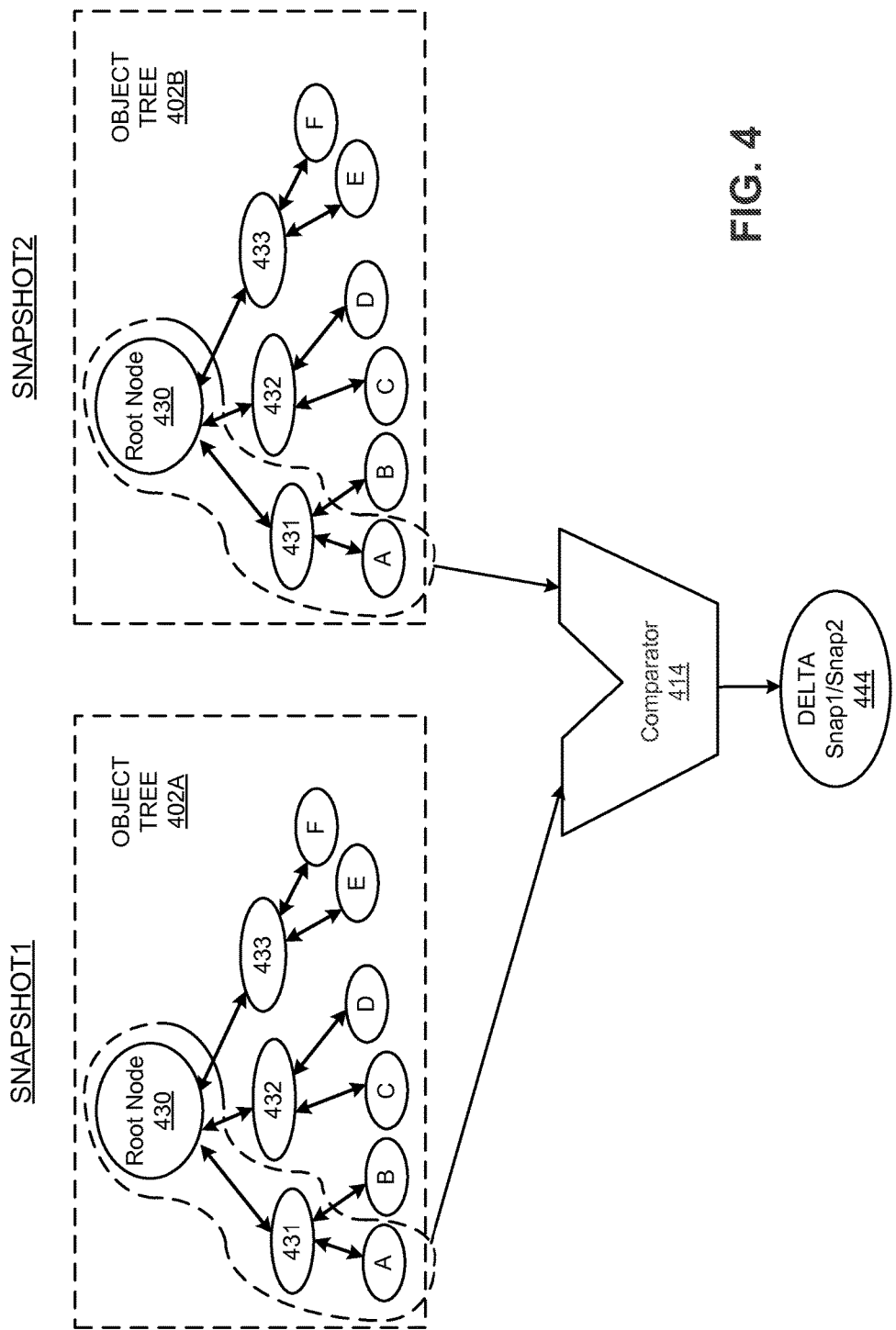
FIG. 4 depicts a conceptual diagram of an example embodiment showing a comparison of two snapshots taken at different points in time to obtain difference data representing the differences between the two snapshots.

Referring back to FIG. 2, the comparison logic 214 is then configured to determine the difference between the first snapshot and the second snapshot by comparing only nodes in the object tree data structure along the path from the leaf node to the root node. FIG. 4 depicts a conceptual diagram of an example embodiment showing a comparison of two snapshots taken at different points in time to obtain difference data representing the differences between the two snapshots. In the illustrated embodiment, a first snapshot1 comprising an object tree data structure 402A is compared with a second snapshot2 comprising an object tree data structure 402B.

A comparator 414 is provided to compare the two snapshots, determine the differences, and to output difference data (or delta snap1/snap2) 444 representing the differences between the object model 402A captured in the first snapshot1 and the object model 402B captured in the second snapshot2. As shown only the previously unfrozen and refrozen object nodes 430, 431 and leaf node A are compared in this embodiment. The remaining object nodes in the object tree data structures that are not in the path from the leaf node A to the root node 430 are left untouched.

The difference data 444 representing the differences between the two snapshots as a result of performing the first action can then be determined using the comparator 414. An algorithm can be used to determine if two objects are equal. For example in Javascript, the following algorithm can be used: (1) if two objects point to the same location in memory, they are equal; and (2) if two objects do not point to the same location in memory, all the properties of the objects must be recursively compared to determine if they contain the same values. Since all object nodes in the two object tree data structures 402 are recursively compared, and since the nodes in the object trees 402 can be compared by a strict equality check except for the few nodes in the path from the root node 430 to the destination node A, the techniques described herein are adapted to provide a more efficient mechanism for comparison, particularly in Javascript.

If the first condition in the algorithm above is true, a potentially deeply-nested comparison over all objects of arbitrary depth is avoided. Since the object model consists of immutable objects that are frozen and unmodified, except for the nodes along the path from the root node to the affected node, the difference data 444 determination is limited to just the path with unfrozen objects from the root node 430 to the leaf node A at the destination. This procedure omits a deep check on the entire object tree data structure 402 except for those few nodes along the path from the root to the destination.

The difference data 444 can then be stored into a first memory buffer. In the preferred embodiment, the memory buffer can be implemented as a stack buffer. A stack buffer (or "stack") is configured to restrict access to units of work in a manner that users expect with undo and redo operations. A stack buffer can be implemented using a last-in, first-out ("LIFO") memory buffer. A stack buffer is a list-like data structure that only permits access at one end of the list. A typical stack is an area of computer memory with a fixed origin and a variable size. Items can be "pushed" onto the top of the stack or "popped" off the top of the stack, but items can never be placed into the buffer anywhere else. More specifically, a "push" operation is one in which a data item is placed at the top of the stack buffer, thus pushing down any other data items already residing in the stack, and a "pop" operation is one in which a data item at the top of the stack is removed, thus popping up any other data items already residing in the stack.

Referring back to FIG. 2, the difference data representing the first action can then be stored into the undo stack buffer 216. When undoing an action, the last action can be popped off the undo stack buffer 216 and pushed onto the redo stack buffer 217, and when redoing an action, the first action can be popped off the redo stack buffer 217 and pushed onto the undo stack buffer 216.

The undo management engine 210 is configured to receive undo commands. For example, the undo management engine 210 can receive an undo command via the graphical interface 219 or the network interface 207 to undo the first action comprising the edit to the object. When an undo command is received, the difference data 444 representing the first action can be retrieved from the undo stack buffer 216 and stored into the redo stack buffer 217. The first action comprising the edit to the object can then be undone by restoring the object model back to its state when the first snapshot was taken.

The undo management engine 210 is also configured to receive redo commands. For example, the undo management engine 210 can receive a redo command via the graphical interface 219 or the network interface 207 to redo the first action comprising the edit to the object. When a redo command is received, the difference data 444 representing the first action can be retrieved from the redo stack buffer 217 and stored back into the undo stack buffer 216. The first action comprising the edit to the object can then be redone by restoring the object model back to its state when the second snapshot was taken.

In at least certain embodiments, the undo management engine 210 is invoked whenever the application is first loaded to manage access to the application objects so that edits can only be made through the undo management process. Snapshots of the object model can be taken after each action of the application to preserve the state of the object model at different points in time. Accordingly, the undo/redo operations can therefore be performed by the embodiments described herein without requiring implementation of a converse action for every action received from the application.

Figure 5:
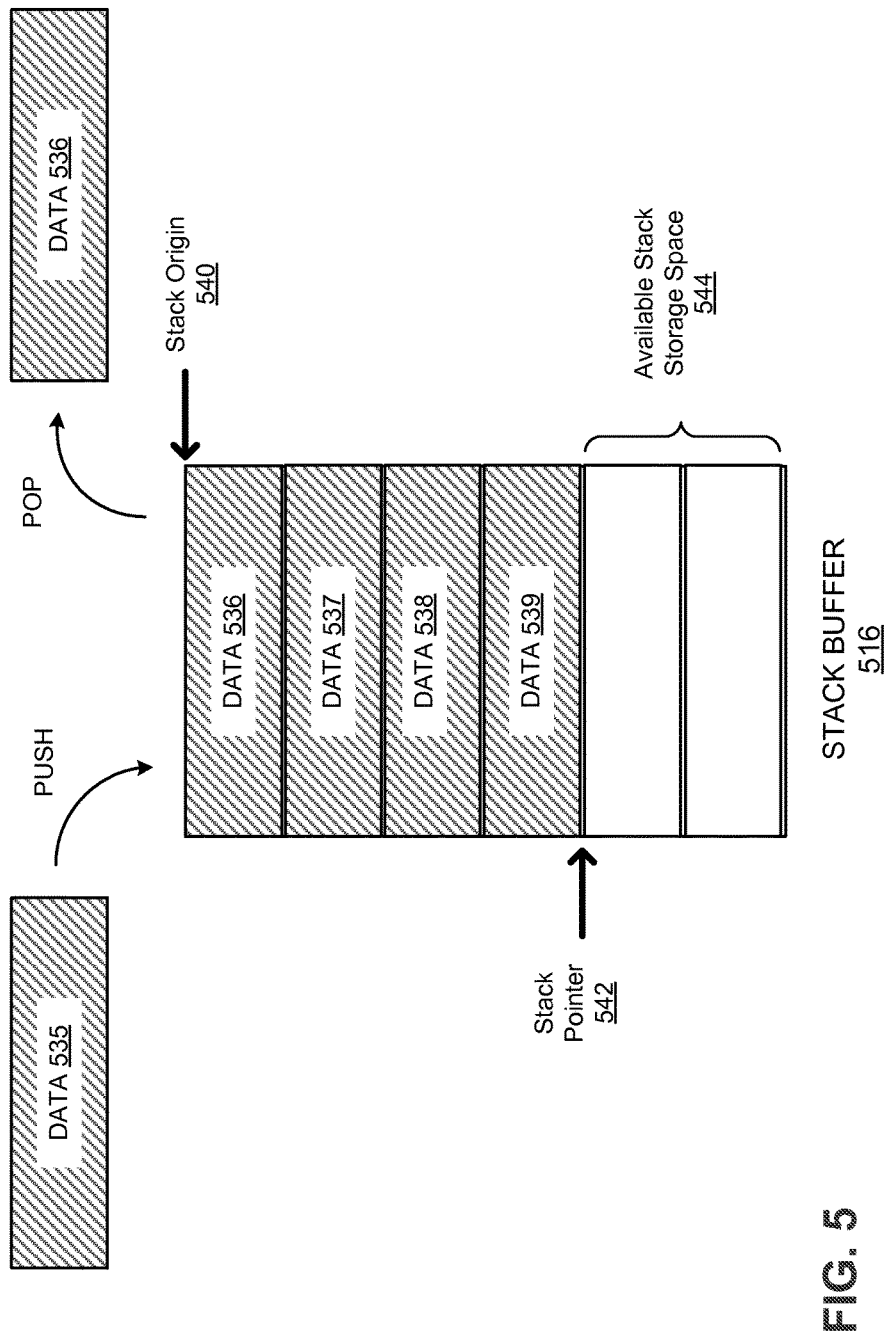
FIG. 5 depicts an example block diagram of a stack buffer for implementing the embodiments described herein.

FIG. 5 depicts an example block diagram of a stack buffer for implementing the embodiments described herein. In the illustrated embodiment, stack buffer 516 includes a stack origin memory address 540 and a stack pointer memory address 542, and available stack storage space 544. In addition, stack buffer 516 is currently loaded with data items 536, 537, 538, and 539.

As will be appreciated by persons of skill in the art, the stack pointer 542 can be implemented in the form of a register and configured to point to the most recently referenced location on the stack. When the stack has a size of zero, the stack pointer points to the origin of the stack 540. As data items are added to the stack, the stack pointer is displaced to indicate the current extent of the stack, which expands away from the origin. As shown the difference data 535 can be pushed onto the top of the stack at the stack origin 540, or the previous difference data 536 can be popped off the top of the stack.

Figure 6A:
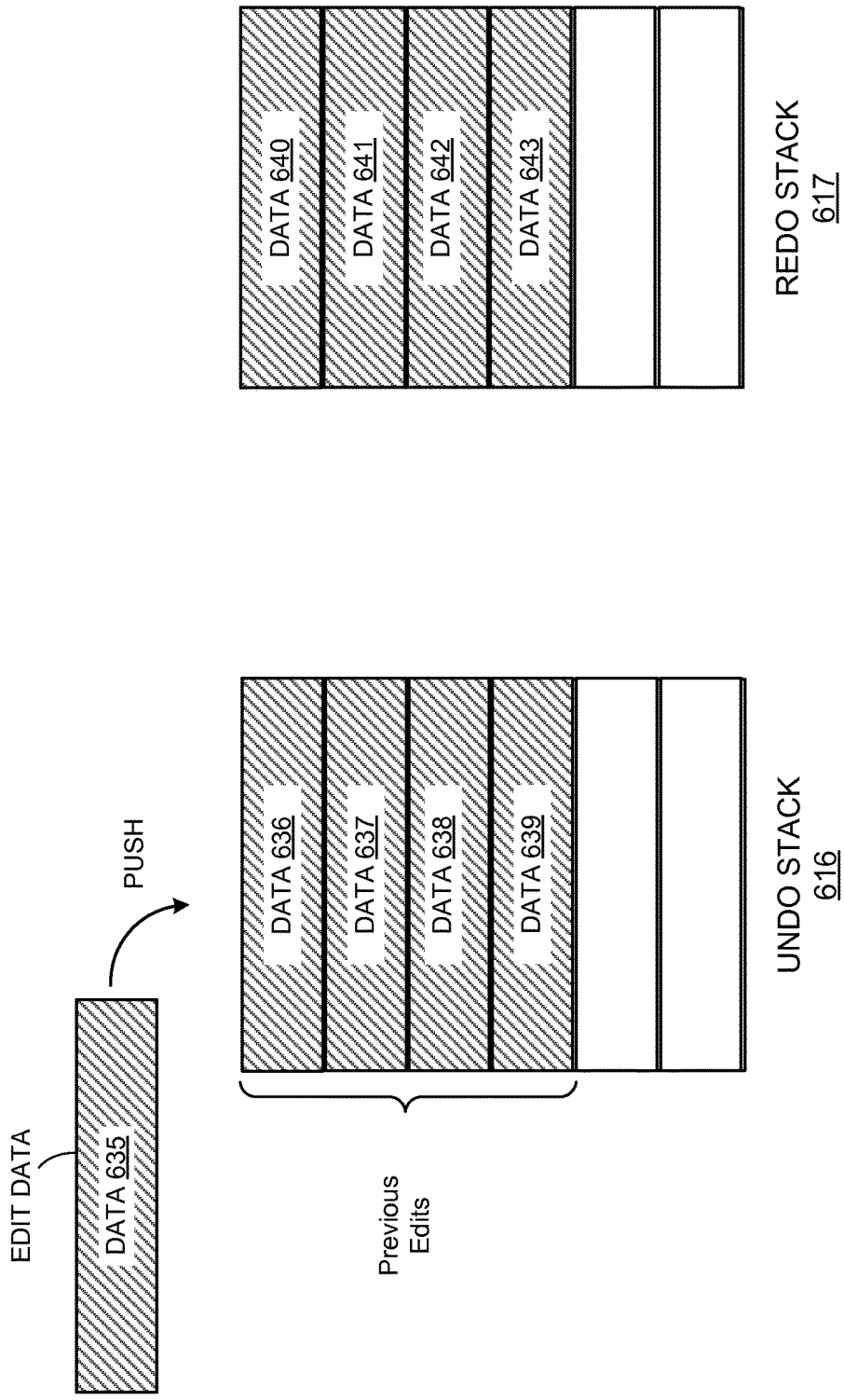
FIGS. 6A-6B depict example block diagrams showing a push operation for storing edit data onto an undo stack buffer according to the techniques described herein.
Figure 6B:
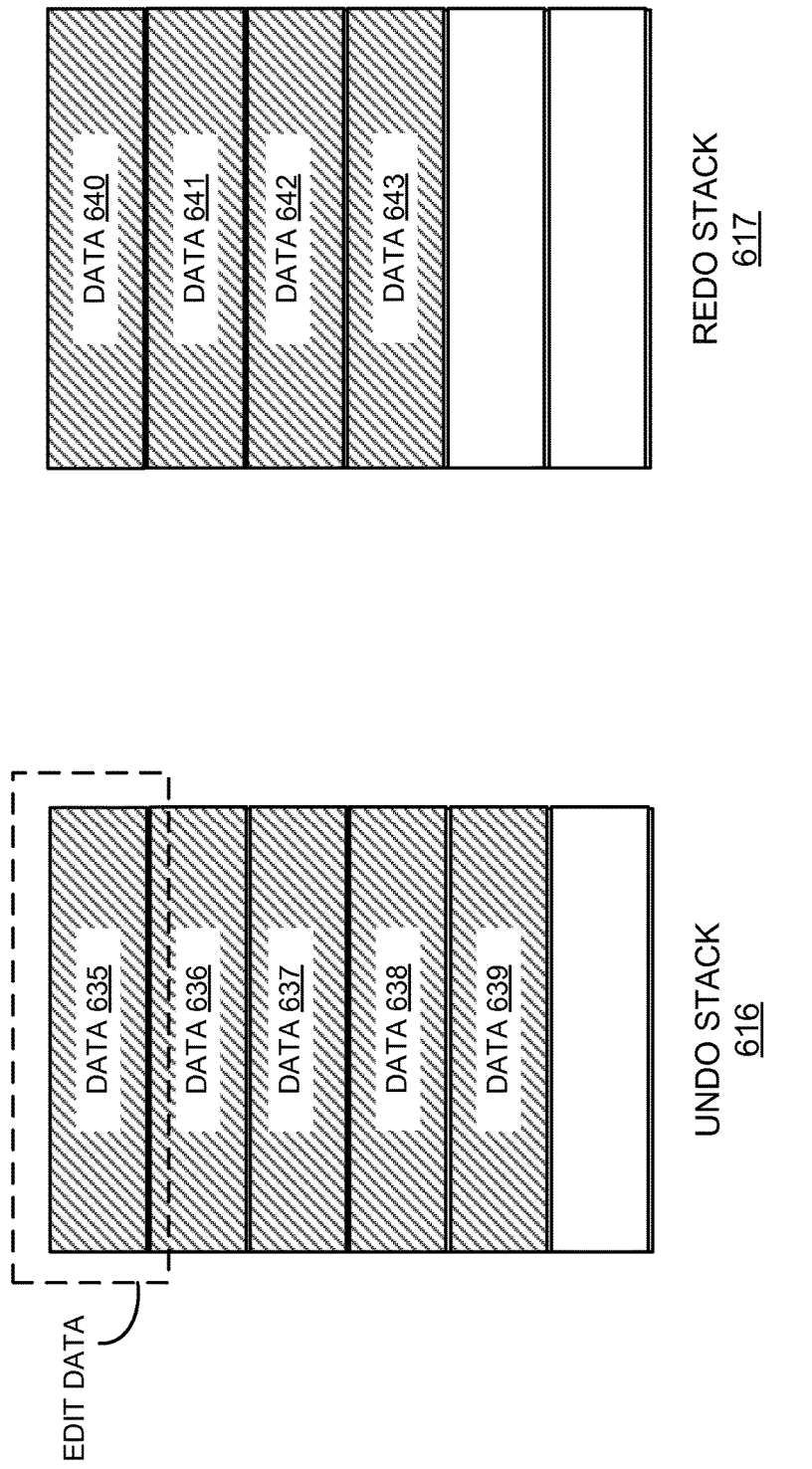

FIGS. 6A-6B depict example block diagrams showing a push operation for pushing an edit data item onto an undo stack buffer according to the techniques described herein. In the illustrated embodiment of FIG. 6A, the previous edit data items 636, 637, 638, and 639 are currently residing in the undo stack 616 and previous edit data items 640, 641, 642, and 643 are currently residing in the redo stack 617. Whenever a first action comprising an edit is received from an application, the edit data 635 is pushed onto the top of the undo stack 616 via a push operation. The results of the operation are shown in FIG. 6B. The edit data 635 is thereafter available in the undo stack 616 to be used during an undo operation.

FIGS. 6C-6D depict example block diagrams showing a pop operation for retrieving edit data off of the undo stack buffer, and a push operation for pushing the edit data onto a redo stack buffer during an undo operation. In the illustrated embodiment of FIG. 6C, the previous edit data items 635, 636, 637, 638, and 639 are currently residing in the undo stack 616 and previous edit data items 640, 641, 642, and 643 are residing in the redo stack 617. During an undo operation, the edit data 635 is popped off of the top of the undo stack 616 via a pop operation, and pushed onto the top of the redo stack 617 via a push operation. The result of the operation is shown in FIG. 6D. The object model is thus restored back to its state when the first snapshot was taken. The edit data 635 is thereafter available in the redo stack 617 to be used during a redo operation.

Figure 6E:
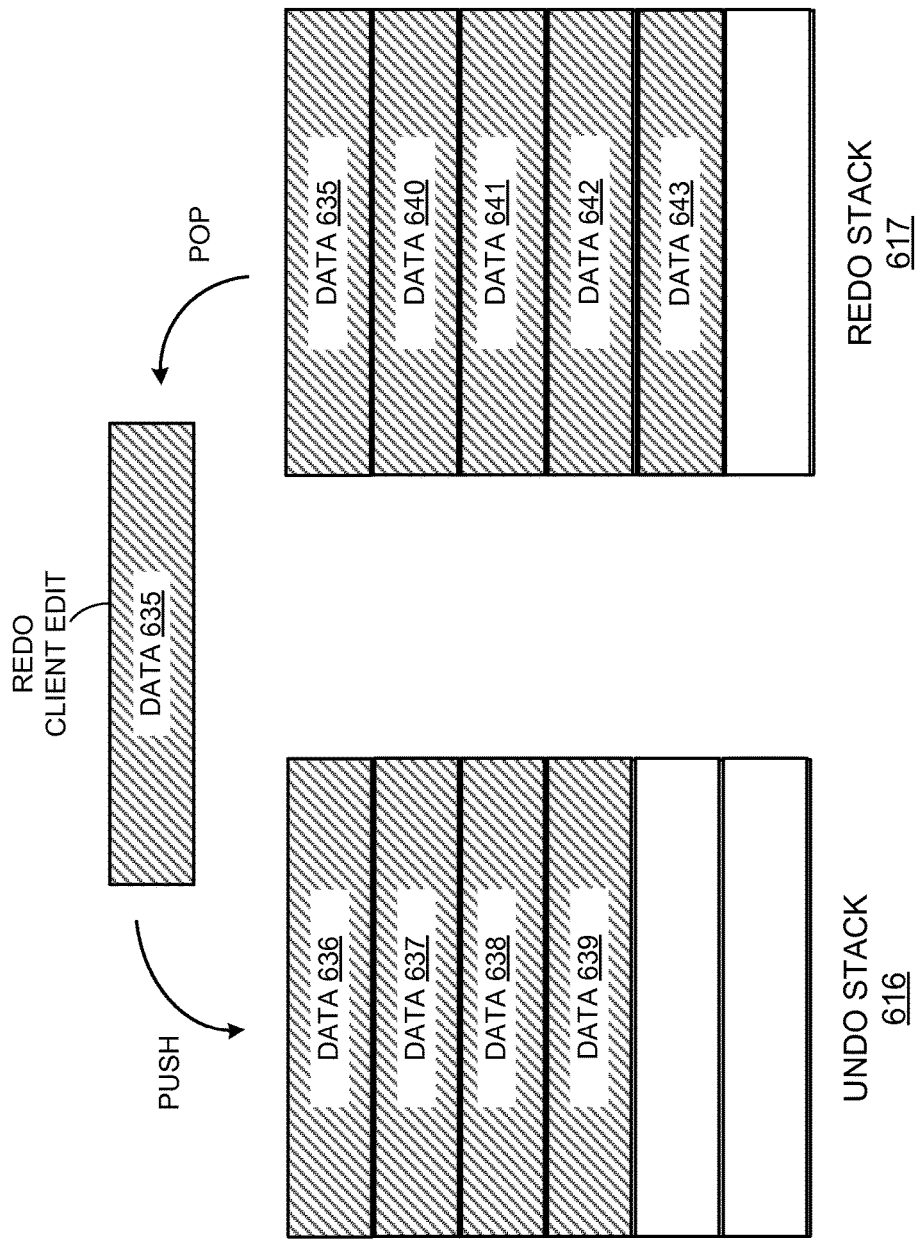
FIG. 6E depicts an example block diagram showing a pop operation for retrieving edit data off of the redo stack buffer, and a push operation for pushing the edit data back onto the undo stack buffer during a redo operation.
Figure 7A:
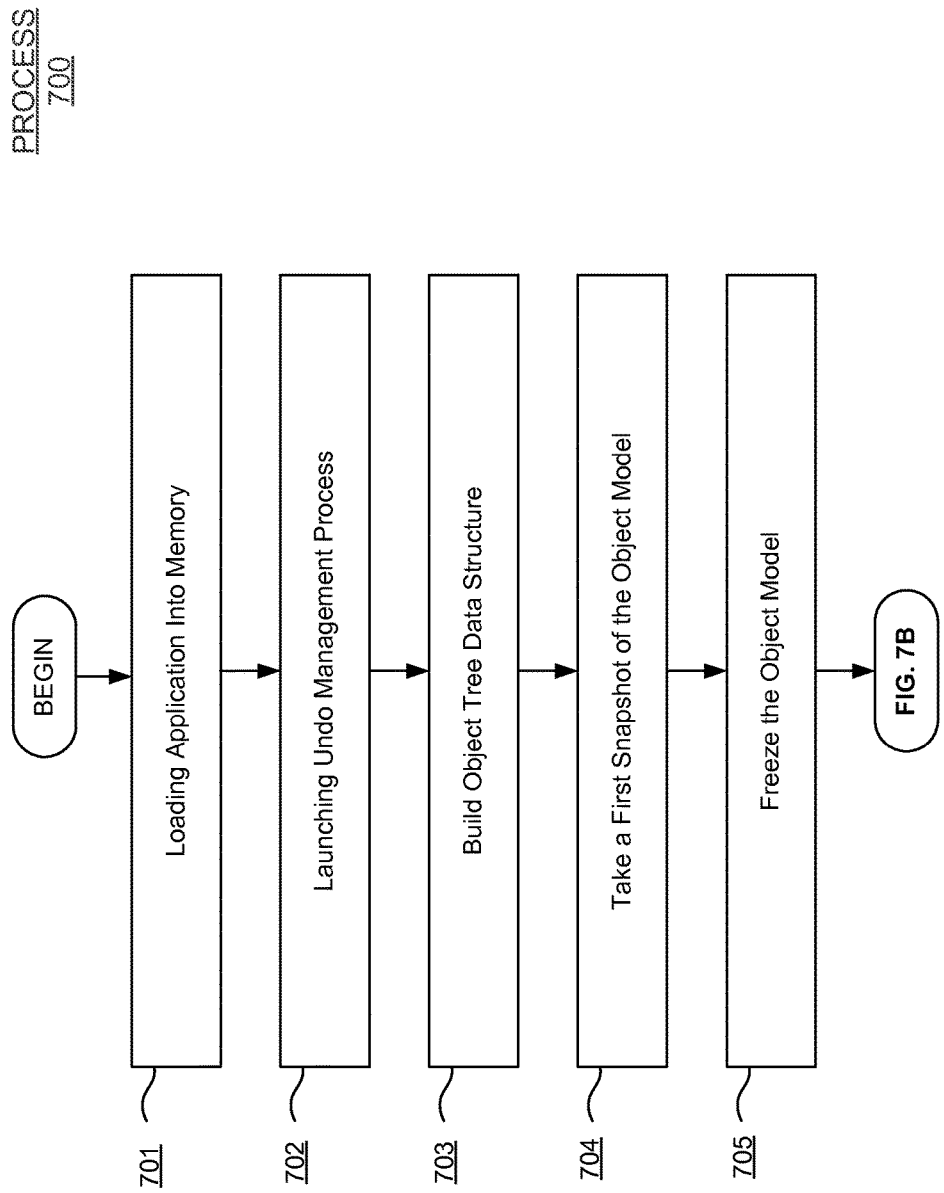

FIG. 6E depicts an example block diagram showing a pop operation for retrieving edit data off of the redo stack buffer, and a push operation for pushing the edit data back onto the undo stack buffer during a redo operation. In the illustrated embodiment, the previous edit data items 636, 637, 638, and 639 are currently residing in the undo stack 616 and previous edit data items 635, 640, 641, 642, and 643 are residing in the redo stack 617. During a redo operation, the edit data 635 is popped off of the top of the redo stack 617 via a pop operation, and pushed back onto the top of the undo stack 616 via a push operation. The object model is thus restored back to its state when the second snapshot was taken. The edit data 635 is thereafter available in the undo stack 616 to be used during a subsequent undo operation.

II. Exemplary Processes

FIGS. 7A-7D depict flow charts of example embodiments of a method for undoing actions in an application according to the techniques described herein. It is noted that the processes described below are exemplary in nature and are provided for illustrative purposes and not intended to limit the scope of the invention to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

The embodiments described herein include an improved model-based system and method for undoing actions in an application. FIGS. 7A-7D depict flow charts of example embodiments of a method for undoing actions in an application according to the techniques described herein. In the illustrated embodiment of FIG. 7A, process 700 begins at operation 701 by loading an application into memory. An undo management process can then be launched that is configured to operate with the application (operation 702). In one embodiment, the undo management process can be invoked whenever the application is first loaded in order to arbitrate access to the application objects so that edits can only be made through the undo management process.

Process 700 continues by building an object model for objects invoked by the application, where the object model comprises an object tree data structure having nodes containing metadata of an object (operation 703). A first snapshot of the object model can then be taken (operation 704) and the object model can be frozen to only permit access for editing through the undo management process (operation 705).

In the illustrated embodiment of FIG. 7B, process 700 continues at operation 706 by receiving a first action from the application comprising an edit to be applied to the object at a leaf node of the object tree data structure. Process 600 is then configured to unfreeze a first portion of the object tree data structure along a path of object nodes from the leaf node being modified by the edit up to its root node (operation 707), to apply the edit to the object at the leaf node of the object tree data structure (operation 708), and then to re-freeze the first portion of the object tree data structure along the path from leaf node to root node to obtain a re-frozen second version of the object model (operation 709).

Process 700 further continues by taking a second snapshot of the re-frozen object model (operation 710) and by determining the difference between the first snapshot and the second snapshot (operation 711). In a preferred embodiment, this can be accomplished by comparing only nodes in the object tree data structure along the path from the destination or leaf node to the root node of that leaf node, including any intermediate parent nodes. The plurality of object nodes in the object tree data structure that are not in the path from the leaf node to the root node are left untouched. At operation 712, the differences between the first snapshot and the second snapshot can then be pushed onto the undo stack as difference data representing the first action.

In the illustrated embodiment of FIG. 7C, process 700 continues by receiving an undo command configured to undo the first action comprising the edit to the object (operation 713), popping the difference data representing the first action off of the undo stack (operation 714), pushing the difference data onto the redo stack (operation 715), and performing the undo operation by restoring the object model back to its state when the first snapshot was taken (operation 716).

In the illustrated embodiment of FIG. 7D, process 700 continues at operation by receiving a redo command configured to redo the first action comprising the edit to the object (operation 717), popping the difference data representing the first action off of the redo stack (operation 718), pushing the difference data back onto the undo stack (operation 719), and performing the redo operation by restoring the object model back to its state when the second snapshot was taken (operation 720).

Snapshots of the object model are taken after each action of the application to preserve the state of the object model at different points in time. The undo/redo operations can therefore be performed without requiring implementation of a converse action for every action received from the application. This completes process 700 according to one example embodiment.

Whenever a user starts an application for editing a document, for example, the undo management engine and document model can be initialized and idle. Upon opening a saved document, the document model is initialized with the contents of the saved file, with visualizations metadata in the document, and all the pertinent subtrees are populated, under visualizations, stories etc. A snapshot is taken when the model is initialized and this forms the pristine snapshot in the undo management process, i.e. the very first state of the model that can be undone. The document model can then be frozen and every object in it therefore becomes immutable, i.e., it cannot be modified except through the undo management process.

A user can then select, for example, a first visualization to change the color of the title text to red. In the document model, the property is changed is along the path: visualizations.0.title.font.color from the old value (e.g., black) to red, i.e. documentModel.visualizations.0.title.font.color=red.

Since the entire document model is frozen, we need to unfreeze objects from the root until the leaf node. First the "visualizations" node of the document model is unfrozen, leaving the siblings such as stories, thumbnails, etc., untouched, since they are not being modified. Then the "0" node is unfrozen, since we're only interested in the first visualization. This process continues in like manner all the way down the path until we get to the "color" leaf node, which is unfrozen and set to the string value "red". Once we've mutated the model and changed the property, the entire object tree data structure can be re-frozen.

A snapshot of the model is taken after this change is made, with the new snapshot being the second snapshot on the undo stack. At this point, the undo management process consists of two immutable snapshots of the document model, with both snapshots pointing to the same immutable objects, except for the objects along the path modified in the operation above. When the user decides to undo the last operation, pop the last snapshot is popped off of the undo stack and pushed onto the redo stack.

At this point, the pristine snapshot is taken and put into the document model. Since the document model sets the state based on the delta between the first and second snapshots, or change in values, it is at this point that the benefits of the immutable objects that make up the document model tree can be observed. The two frozen objects are then compared. In one embodiment, they can be compared using pointer arithmetic. If the two frozen objects point to the same location, their sub-objects likewise cannot have changed. However, if they don't point to the same location, the process must recursively compare all the object nodes down each of the subtrees until the next pair of objects that aren't equal is found. In this manner, the undo management process can optimize the comparison of two objects (e.g., Javascript objects) for better Undo/Redo performance capabilities.

III. Exemplary Hardware Implementation

Embodiments of the present invention may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 8:
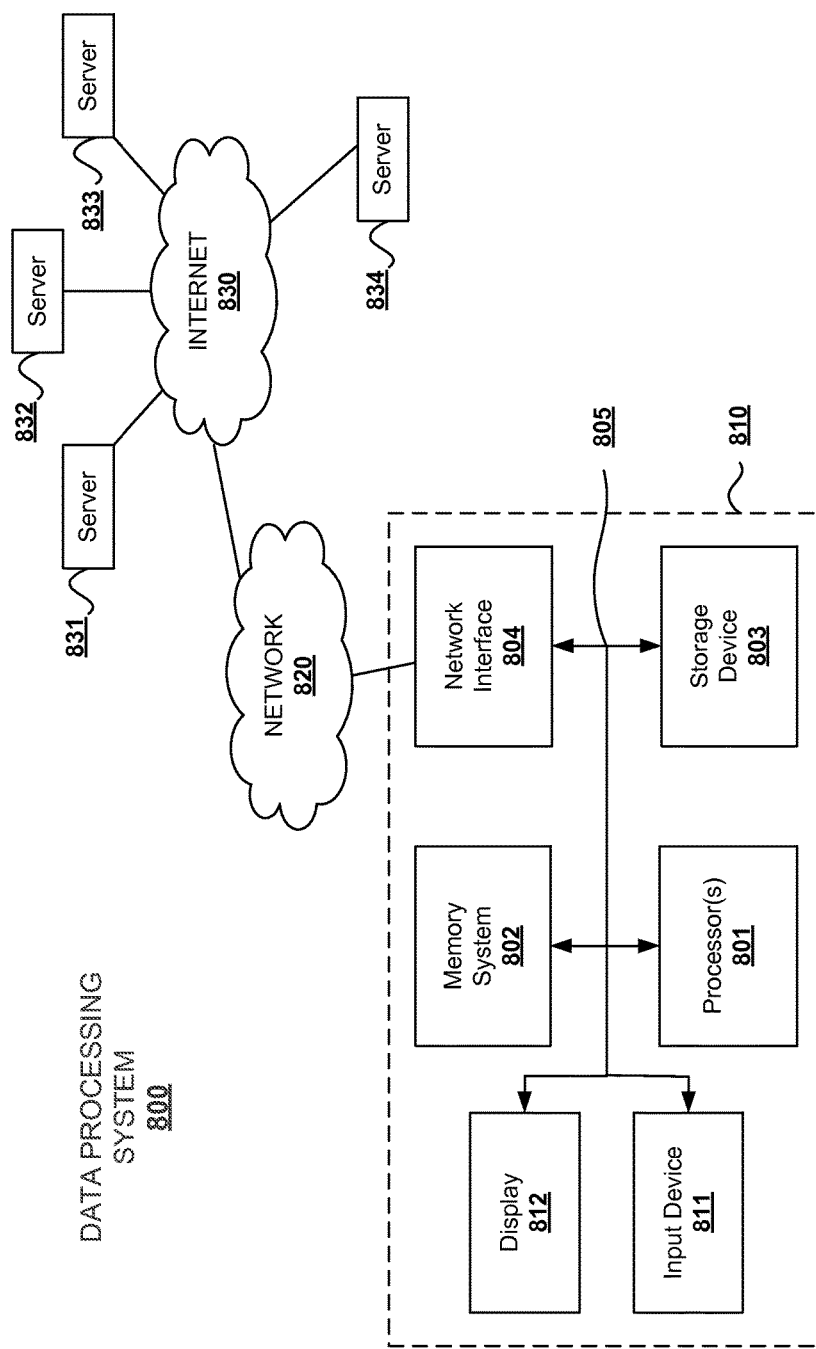
FIG. 8 depicts an example overview block diagram of a data processing system upon which the embodiments described herein may be implemented.

FIG. 8 depicts an example overview block diagram of a data processing system upon which the embodiments described herein may be implemented. The following hardware description is merely one example. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the invention. It will be apparent, however, to persons skilled in the art that these embodiments may be practiced without some of these specific details. The above examples and embodiments should not be deemed to be the only embodiments, and are presented to illustrate the flexibility and advantages of the present invention. Other arrangements, embodiments, implementations and equivalents will be evident to those skilled in the art and may be employed without departing from the spirit and scope of the invention as defined by the following claims.

What is claimed is:

1. A method for undoing actions in an application comprising:
    launching an undo management process configured to operate with the application;
    building an object model for objects invoked by the application, wherein the object model comprises an object tree data structure having nodes containing metadata of an object;
    taking a first snapshot of the object model;
    freezing the object model;
    receiving a first action from the application comprising an edit to be applied to the object at a leaf node of the object tree data structure;
    unfreezing a first portion of the object tree data structure along a path of object nodes from the leaf node being modified by the edit up to its root node;
    applying the edit to the object at the leaf node of the object tree data structure;
    re-freezing the first portion of the object tree data structure to obtain a re-frozen object model;
    taking a second snapshot of the re-frozen object model;
    storing a difference between the first snapshot and the second snapshot into a first memory buffer as difference data representing the first action;
    receiving a second action from the application comprising an undo command configured to undo the first action comprising the edit to the object;
    retrieving the difference data representing the first action from the first memory buffer;
    storing the difference data into a second memory buffer; and
    undoing the first action comprising the edit to the object by restoring the object model back to its state when the first snapshot was taken.

2. The method of claim 1 further comprising leaving untouched object nodes in the object tree data structure that are not in the path from the leaf node to the root node.

3. The method of claim 1 wherein the undo management process is invoked at the time when the application is first loaded to manage access to application objects.

4. The method of claim 1 wherein access for editing can only be made through the undo management process.

5. The method of claim 1 further comprising taking snapshots of the object model after each action of the application to preserve the state of the object model at different points in time.

6. The method of claim 1 further comprising
    determining the difference between the first snapshot and the second snapshot by comparing only nodes in the object tree data structure along the path from the leaf node to the root node.

7. The method of claim 6 further comprising:
    receiving a third action from the application comprising a redo command configured to redo the first action comprising the edit to the object;
    retrieving the difference data representing the first action from the second memory buffer;
    storing the difference data representing the first action back into the first memory buffer; and
    redoing the first action comprising the edit to the object by restoring the object model back to its state when the second snapshot was taken.

8. The method of claim 1 wherein the first memory buffer is an undo stack buffer and the second memory buffer is a redo stack buffer.

9. The method of claim 1 wherein undo and redo operations are performed without requiring implementation of a converse action for every action received from the application.

10. A system for undoing actions in an application comprising:
    a processor;
    a system memory in communication with the processor via a communication link, the system memory configured to store computer code, which when executed by the processor, causes the processor to perform operations comprising:

launching an undo management process configured to operate with the application;
building an object model for objects invoked by the application, wherein the object model comprises an object tree data structure having nodes containing metadata of an object;
taking a first snapshot of the object model;
freezing the object model;
receiving a first action from the application comprising an edit to be applied to the object at a leaf node of the object tree data structure;
unfreezing a first portion of the object tree data structure along a path of object nodes from the leaf node being modified by the edit up to its root node;
applying the edit to the object at the leaf node of the object tree data structure;
re-freezing the first portion of the object tree data structure to obtain a re-frozen object model;
taking a second snapshot of the re-frozen object model;
storing a difference between the first snapshot and the second snapshot into a first memory buffer as difference data representing the first action;
receiving a second action from the application comprising an undo command configured to undo the first action comprising the edit to the object;
retrieving the difference data representing the first action from the first memory buffer;
storing the difference data into a second memory buffer; and
undoing the first action comprising the edit to the object by restoring the object model back to its state when the first snapshot was taken.

11. The system of claim 10 wherein the operations further comprise leaving untouched object nodes in the object tree data structure that are not in the path from the leaf node to the root node.

12. The system of claim 10 wherein access for editing can only be made through the undo management process.

13. The system of claim 10 wherein the operations further comprise
determining the difference between the first snapshot and the second snapshot by comparing only nodes in the object tree data structure along the path from the leaf node to the root node; and.

14. The system of claim 13 wherein the operations further comprise:
receiving a third action from the application comprising a redo command configured to redo the first action comprising the edit to the object;
retrieving the difference data representing the first action from the second memory buffer;
storing the difference data representing the first action back into the first memory buffer; and
redoing the first action comprising the edit to the object by restoring the object model back to its state when the second snapshot was taken.

15. The system of claim 10 wherein the operations further comprise taking snapshots of the object model after each action of the application to preserve the state of the object model at different points in time.

16. A non-transitory computer readable storage medium tangibly embodying computer code, which when executed by a computer system, causes the computer system to perform operations for undoing actions in an application, the operations comprising:
building an object model for objects invoked by the application, wherein the object model comprises an object tree data structure having nodes containing metadata of an object;
taking a first snapshot of the object model;
freezing the object model;
receiving a first action from the application comprising an edit to be applied to the object at a leaf node of the object tree data structure;
unfreezing a first portion of the object tree data structure along a path of object nodes from the leaf node being modified by the edit up to its root node;
applying the edit to the object at the leaf node of the object tree data structure;
re-freezing the first portion of the object tree data structure to obtain a re-frozen object model;
taking a second snapshot of the re-frozen object model;
storing a difference between the first snapshot and the second snapshot into a first memory buffer as difference data representing the first action;
receiving a second action from the application comprising an undo command configured to undo the first action comprising the edit to the object;
retrieving the difference data representing the first action from the first memory buffer;
storing the difference data into a second memory buffer; and
undoing the first action comprising the edit to the object by restoring the object model back to its state when the first snapshot was taken.

17. The computer readable storage medium of claim 16 wherein object nodes in the object tree data structure that are not in the path from the leaf node to the root node are left untouched.

18. The computer readable storage medium of claim 16 wherein access for editing can only be made through the undo management process.

19. The computer readable storage medium of claim 16 wherein the operations further comprise
determining the difference between the first snapshot and the second snapshot by comparing only nodes in the object tree data structure along the path from the leaf node to the root node; and.

20. The computer readable storage medium of claim 19 wherein the operations further comprise:
receiving a third action from the application comprising a redo command configured to redo the first action comprising the edit to the object;
retrieving the difference data representing the first action from the second memory buffer;
storing the difference data representing the first action back into the first memory buffer; and
redoing the first action comprising the edit to the object by restoring the object model back to its state when the second snapshot was taken.

21. The computer readable storage medium of claim 16 wherein the operations further comprise taking snapshots of the object model after each action of the application to preserve the state of the object model at different points in time.

22. The computer readable storage medium of claim 16 wherein the undo management process is invoked at the time when the application is first loaded to manage access to application objects.

* * * * *